United States Patent
O'Connell et al.

(10) Patent No.: US 11,856,327 B2
(45) Date of Patent: Dec. 26, 2023

(54) ADAPTIVE AUDIO QUALITY AMELIORATION FOR VIDEO CONFERENCING

(71) Applicant: Kyndryl, Inc., New York, NY (US)

(72) Inventors: Brian M. O'Connell, Cary, NC (US); Mike John Lyons, Melbourne (AU); Zachary A. Silverstein, Georgetown, TX (US); Jeremy R. Fox, Georgetown, TX (US)

(73) Assignee: KYNDRYL, INC., New York, NY (US)

( * ) Notice: Subject to any disclaimer, the term of this patent is extended or adjusted under 35 U.S.C. 154(b) by 4 days.

(21) Appl. No.: 17/726,997

(22) Filed: Apr. 22, 2022

(65) Prior Publication Data

US 2023/0344965 A1    Oct. 26, 2023

(51) Int. Cl.
- *H04N 7/15* (2006.01)
- *G10L 21/0324* (2013.01)
- *H04B 17/318* (2015.01)
- *H04L 12/18* (2006.01)

(52) U.S. Cl.
CPC ........... *H04N 7/15* (2013.01); *G10L 21/0324* (2013.01); *H04B 17/318* (2015.01); *H04L 12/1818* (2013.01)

(58) Field of Classification Search
CPC ...... H04N 7/15; H04N 7/147; G10L 21/0324; H04L 65/403
USPC ............................................ 348/14.01–14.16
See application file for complete search history.

(56) References Cited

U.S. PATENT DOCUMENTS

| | | | |
|---|---|---|---|
| 10,757,366 B1 * | 8/2020 | Kwatra | ................... H04N 7/147 |
| 11,095,853 B1 * | 8/2021 | Aher | .................... H04N 7/15 |
| 2015/0280970 A1 * | 10/2015 | Heda | .................. H04L 12/1822 714/4.11 |
| 2018/0176508 A1 * | 6/2018 | Pell | ...................... H04L 65/403 |
| 2019/0089456 A1 * | 3/2019 | Kasilya Sudarsan | .. H04N 7/185 |
| 2019/0141289 A1 | 5/2019 | Rosenberg | |
| 2019/0189117 A1 | 6/2019 | Kumar | |

(Continued)

FOREIGN PATENT DOCUMENTS

CN    111262737 A   *  6/2020

OTHER PUBLICATIONS

Mell et al., "The NIST Definition of Cloud Computing", NIST, Special Publication 800-145, Sep. 2011, 7 pages.

(Continued)

*Primary Examiner* — Melur Ramakrishnaiah
(74) *Attorney, Agent, or Firm* — Dan Housley; Andrew M. Calderon; Calderon Safran & Cole P.C.

(57) ABSTRACT

A computer-implemented method, including: receiving, by the computing device, connecting device data from a connecting device associated with a participant of the video conference, wherein the connecting device data includes an audio quality data and a device connectivity data; determining, by the computing device, a conferencing readiness score based on the connecting device data; determining, by the computing device, the conferencing readiness score does not meet a threshold score; determining, by the computing device, an ameliorative action configured to raise the conferencing readiness score to meet the threshold score; and providing, by the computing device, the ameliorative action to the connecting device.

20 Claims, 7 Drawing Sheets

(56) References Cited

U.S. PATENT DOCUMENTS

| | | | |
|---|---|---|---|
| 2019/0215482 A1* | 7/2019 | Sathya | H04N 7/15 |
| 2019/0260987 A1* | 8/2019 | Amini | H04W 88/18 |
| 2021/0051035 A1* | 2/2021 | Atkins | H04L 12/1827 |
| 2021/0160306 A1* | 5/2021 | Waterton | H04L 51/18 |
| 2021/0168178 A1 | 6/2021 | Bhamidipati et al. | |
| 2022/0319537 A1* | 10/2022 | Michaelis | G10L 15/22 |

OTHER PUBLICATIONS

Unknown, "WebEx Adhoc", https://ituc.service-now.com/kb?id=kb_search&query=webex, University of Cincinnati, downloaded Apr. 15, 2022, 11 pages.

Unknown, "Lync ad hoc meetings and sharing", https://support.microsoft.com/en-us/office/lync-ad-hoc-meetings-and-sharing-9746d60f-73e0-4296-90c7-fbbcd917975d?ui=en-us&rs=en-us&ad=us, Microsoft Support, 2013, 6 pages.

Unknown, "Poly Clariti—Private Video Conferencing Software", https://www.poly.com/us/en/products/video-conferencing/clariti, downloaded Apr. 22, 2022, 5 pages.

John White et al., "Ineffective Meetings Cost Companies Up to $283 Billion a Year (So Streamline Collaboration With These Tips)", https://www.inc.com/john-white/ineffective-meetings-cost-companies-up-to-283-billion-a-year-streamline-collaboration-with-these-tips.html, Oct. 19, 2017, 9 pages.

* cited by examiner

ADAPTIVE AUDIO QUALITY AMELIORATION FOR VIDEO CONFERENCING

BACKGROUND

Aspects of the present invention relate generally to video conferencing and, more particularly, to ameliorating video conferencing audio issues pre-participation through a readiness determination.

SUMMARY

In a first aspect of the invention, there is a computer-implemented method including: receiving, by a computing device, connecting device data from a connecting device associated with a participant of a video conference, wherein the connecting device data includes audio quality data and device connectivity data; determining, by the computing device, a conferencing readiness score based on the connecting device data; determining, by the computing device, the conferencing readiness score does not meet a threshold score; determining, by the computing device, an ameliorative action configured to raise the conferencing readiness score to meet the threshold score; and providing, by the computing device, the ameliorative action to the connecting device.

In another aspect of the invention, there is a computer program product including one or more computer readable storage media having program instructions collectively stored on the one or more computer readable storage media. The program instructions are executable to: receive client device data from a client device associated with a participant of a video conference, wherein the client device data includes audio quality data and client connectivity data; determine a conferencing readiness score based on the client device data; determine the conferencing readiness score does not meet a threshold score; determine an ameliorative action configured to raise the conferencing readiness score to meet the threshold score; and provide the ameliorative action to the client device.

In another aspect of the invention, there is system including a processor, a computer readable memory, one or more computer readable storage media, and program instructions collectively stored on the one or more computer readable storage media. The program instructions are executable to: receive host device data from a hosting device associated with a host of a video conference; receive client device data from a client device associated with a participant of the video conference, wherein the client device data includes audio quality data and client connectivity data; determine a readiness score based on the client device data; determine the readiness score does not meet a threshold score; determine an ameliorative action to raise the readiness score to meet the threshold score, wherein the ameliorative action is based on the client device data and a social relationship to the participant; and provide the ameliorative action to the client device.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
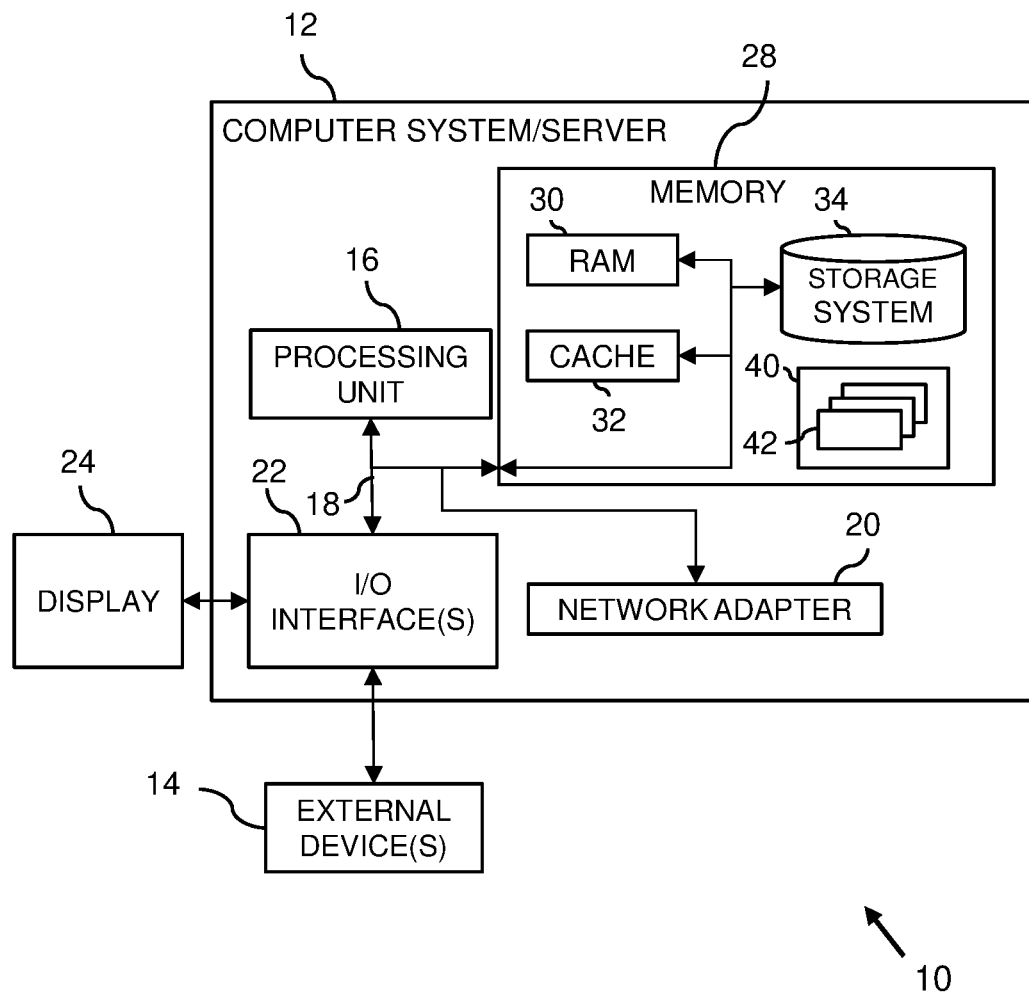
FIG. 1 depicts a cloud computing node according to an embodiment of the present invention.

Aspects of the present invention relate generally to video conferencing and, more particularly, to pre-participation audio quality analysis of video conferencing participants. In embodiments, a computing device facilitates readiness determinations for video conferencing participants. In this manner, implementations of the invention provide audio quality analysis to determine readiness of participants.

In aspects of the invention, there is a method for preparing a plurality of participants to participate in an online meeting before the meeting starts, including: detecting for each participant, as they attempt to join the online meeting, a set of participant parameters including participant physical location (e.g., as determined by IP address of a computer being used by that participant), participant audio device quality (e.g., as determined by audio devices connected to the computer being used by that participant), and participant connectivity (e.g., as determined by bandwidth available to the computer being used by that participant); determining whether each participant, based upon their set of participant parameters, satisfies a meeting readiness score; providing a corrective support action for a corresponding participant to increase their score for each corresponding participant that has a meeting readiness score that is below a threshold; and automatically beginning the meeting once all of the participants have achieved the threshold meeting readiness score.

In aspects of the invention, the method includes corrective support actions for a participant having low audio device quality or low connectivity, the corrective support actions including: locating, based on the participant's physical location, another participant nearby with a higher audio quality or connectivity; and instructing the other participant to share a computer and/or audio device with the nearby participant with the low audio device quality or low connectivity.

Joining a video conference can often lead to irritation at how long it takes for all the participants to get connected to the audio. Many people complain that the audio connection experiences a significant lag in contrast to the video feeds which quickly acquire the video conference. For example, when joining video conferences, people are connected quickly but may spend a couple of minutes just to get the audio connected and audio quality maximized for all the participants.

Implementations of the invention provide an improvement in the technical field of video conferencing by providing a technical solution to these problems with audio connection and quality during video conferencing. In embodiments, the technical solution involves: receiving, by a computing device, connecting device data from a connecting device associated with a participant of a video conference, wherein the connecting device data includes audio quality data and device connectivity data; determining, by the computing device, a conferencing readiness score based on the connecting device data; determining, by the computing device, the conferencing readiness score does not meet a threshold score; determining, by the computing device, an ameliorative action configured to raise the conferencing readiness score to meet the threshold score; and providing, by the computing device, the ameliorative action to the connecting device. These steps allow the video conference audio quality amelioration device to better manage audio quality and audio connections for participants and more efficiently provide users with ameliorative steps before joining a video conference to prevent wasted time during the video conference.

Implementations of the invention utilize a historical feedback loop for audio devices and audio configurations within a physical location. In embodiments, the historical feedback loop may include computer modelling such as machine learning and/or natural language processing (NLP) models to better determine audio device and audio configuration selection for a physical location. In embodiments, the audio configuration may include audio connections and other configurations that may affect audio quality of the audio devices in the physical location. The term "machine learning"—and based on that the term "machine learning model" or "machine learning processing"— may denote known methods of enabling a computer system to improve its capabilities automatically through experience and/or repetition without procedural programming. Thereby, machine learning can be seen as a subset of artificial intelligence. Machine learning algorithms build a mathematical model— i.e., the machine learning model—based on sample data, known as "training data", in order to make predictions or decisions without being explicitly programmed to do so.

It should be understood that, to the extent implementations of the invention collect, store, or employ personal information provided by, or obtained from, individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
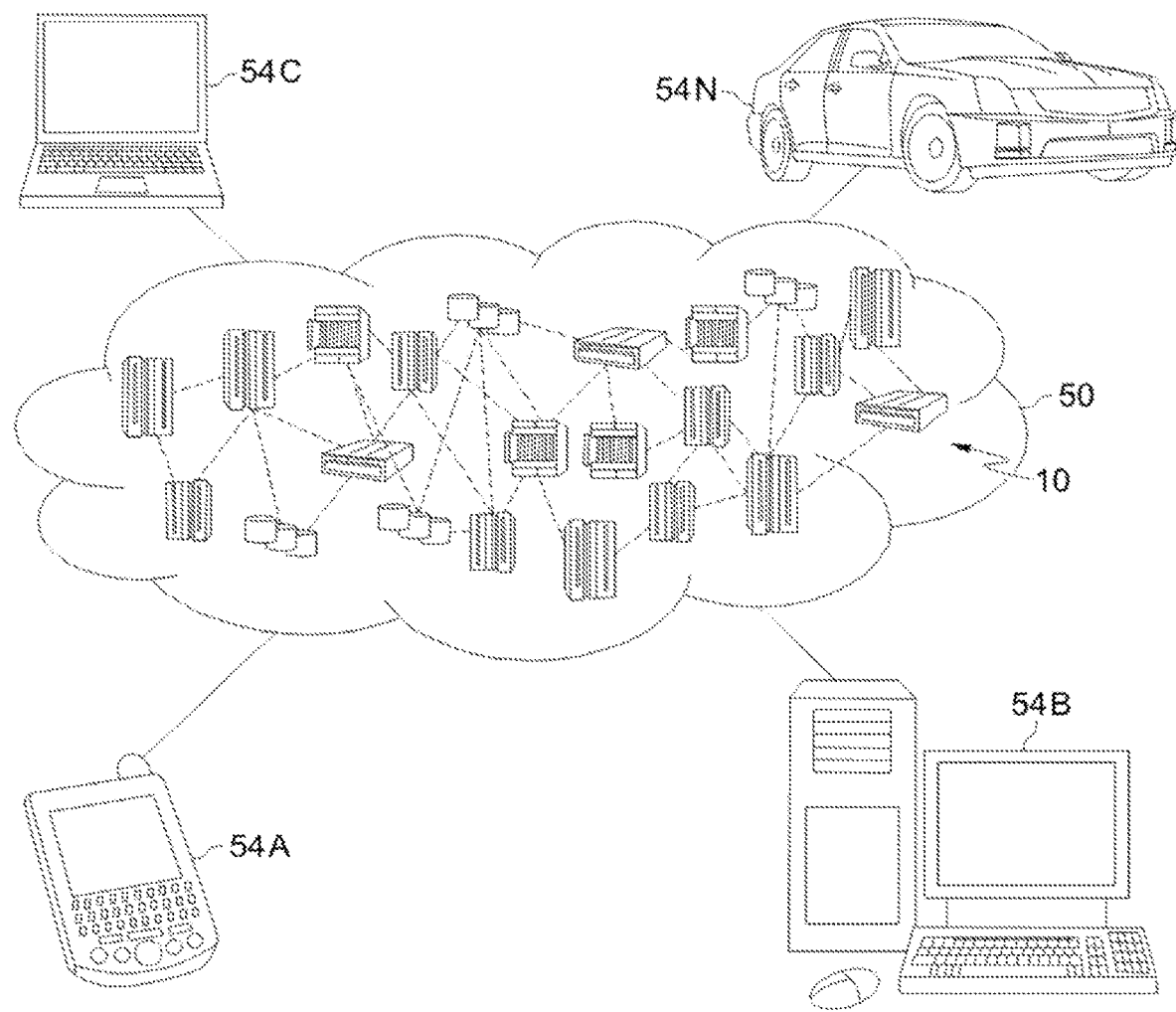
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
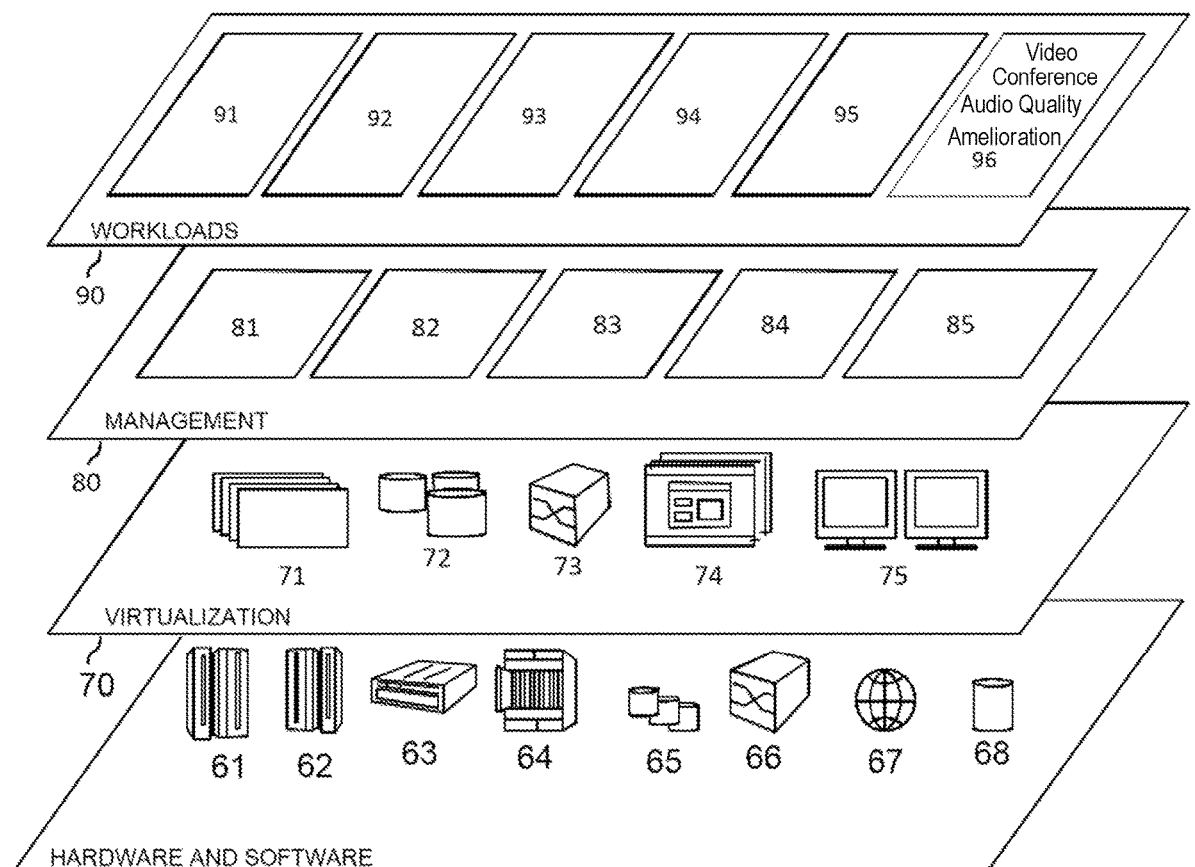
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and video conference audio quality amelioration 96.

Implementations of the invention may include a computer system/server 12 of FIG. 1 in which one or more of the program modules 42 are configured to perform (or cause the computer system/server 12 to perform) one or more functions of the video conference audio quality amelioration 96 of FIG. 3. For example, the one or more of the program modules 42 may be configured to: receive, by a computing device, connecting device data from a connecting device associated with a participant of a video conference, wherein the connecting device data includes audio quality data and device connectivity data; determine, by the computing device, a conferencing readiness score (also referred to as the "readiness score") based on the connecting device data; determine, by the computing device, the conferencing readiness score does not meet a threshold score; determine, by the computing device, an ameliorative action configured to raise the conferencing readiness score to meet the threshold score; and provide, by the computing device, the ameliorative action to the connecting device.

Figure 4:
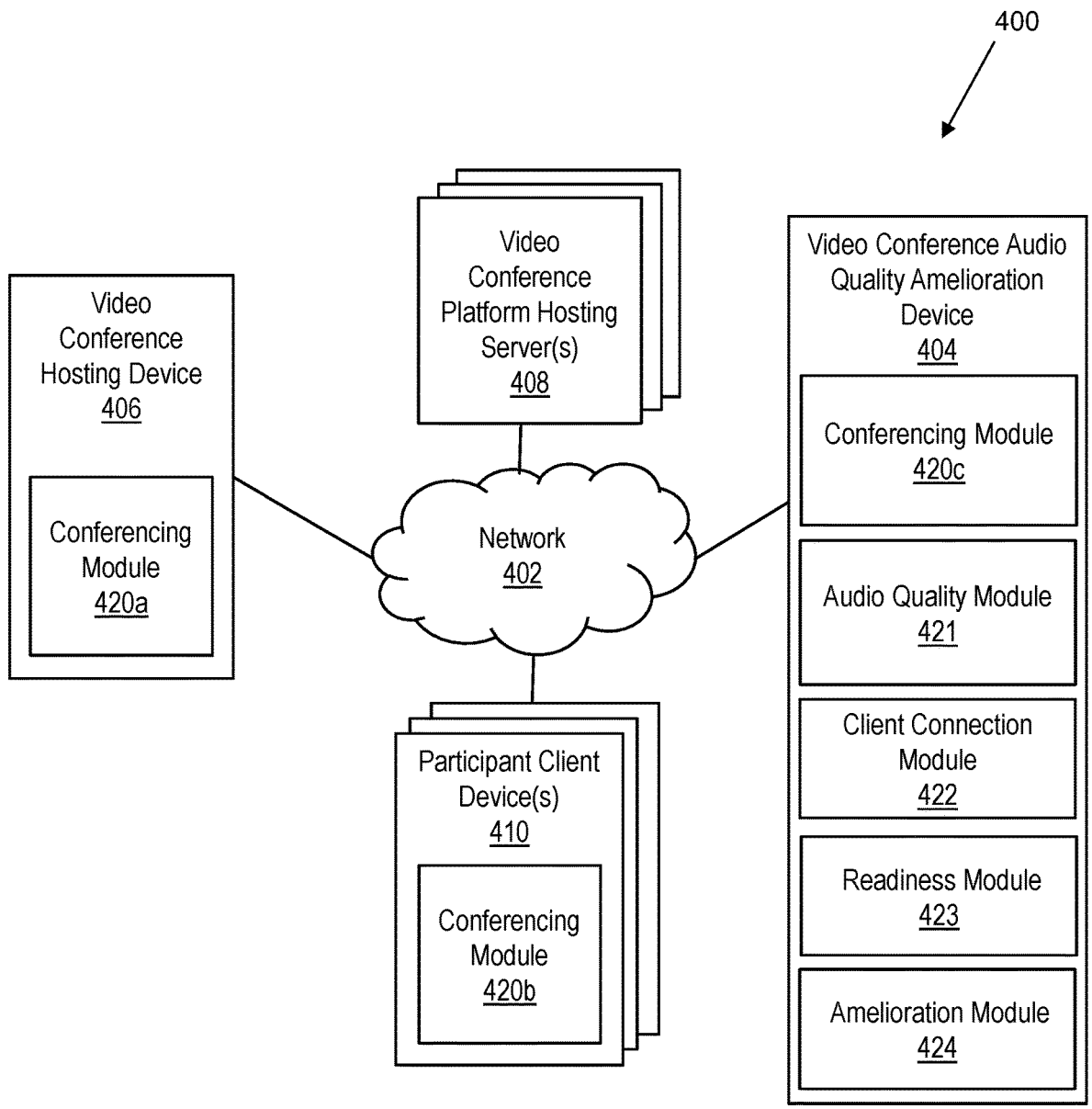
FIG. 4 shows a block diagram of an exemplary environment in accordance with aspects of the invention.

FIG. 4 shows a block diagram of an exemplary video conferencing audio quality amelioration environment in accordance with aspects of the invention. In embodiments, the video conferencing audio quality amelioration environment 400 includes a network 402 enabling communication between video conference audio quality amelioration device 404, video conference hosting device 406 (referred to as a hosting device 406), video conference platform hosting server(s) 408, and participant client device(s) 410 (referred to as a client device 410).

In embodiments, the hosting device 406 comprises a computing device (e.g., the computer system/server 12 of FIG. 1, or elements thereof) in a networked environment. In implementations, the hosting device 406 comprises a personal computing device (e.g., 54A, 54B, 54C, etc.) in the cloud computing environment 50 of FIG. 2. The hosting device 406 may comprise one or more program modules such as program modules 42 described with respect to FIG. 1. In accordance with aspects of the invention described below, the hosting device 406 may manage and store preference data for participating in a video conference by users of client device(s) 410. The hosting device 406 may store a database of users including data of user related devices, audio quality levels, and audio connection levels. Although the instant application may reference the conference as video conferences particularly, all these terms including "web conferencing", "e-conferencing", "virtual conferencing", "web meetings", etc., may be used interchangeably. In an exemplary embodiment, the hosting device 406 comprises an installed conferencing module 420a that is used to collect audio connection and quality data for the hosting device 406.

In embodiments, the video conference platform hosting server(s) 408 comprise computing devices of a video conferencing platform used to host video conferences on the video conferencing platform. Video conferencing platforms may include, but are not limited to, Zoom™, WebEx™, Microsoft Teams™, Google Meet™, Skype™, etc. The video conferencing platform may host the video conference on the video conference platform hosting server(s) 408; however, hosting device 406 will initiate, via the video conferencing platform, the video conference through a video conference platform interface.

In embodiments, the client device(s) 410 comprise computing devices (e.g., the computer system/server 12 of FIG. 1, or elements thereof) in a networked environment. In implementations, the client device(s) 410 comprise personal computing devices (e.g., 54A, 54B, 54C, etc.) in the cloud computing environment 50 of FIG. 2. The client device(s) 410 may comprise one or more program modules such as program modules 42 described with respect to FIG. 1. In accordance with aspects of the invention described below, the client device(s) 410 may manage and store data for audio device configuration and connection for participating in the video conference. In embodiments, the client device(s) 410 comprise an installed conferencing module 420b that is used to collect audio connection and quality data for the client device(s) 410.

In embodiments, the hosting device 406 and client device(s) 410 are all participants in the video conference (i.e., are all connecting devices to the video conference). However, audio quality for the hosting device 406 may largely be focused on connected audio input devices (e.g., microphones), whereas audio quality for the client device(s) 410 may largely be focused on connected audio output devices (e.g., headphones, speakers, etc.). In embodiments, hosting device 406 and client device(s) 410 may include connected audio input devices and connected audio output devices with separate audio quality and connection levels. Therefore, the hosting device 406 and client device(s) 410 may each consider the connected audio input device and connected audio output device using separate readiness scores (as some video conferences will have more interaction among the participants). For example, when one readiness score (either the connected audio input device or connected audio output device) of a hosting device 406 does not meet a threshold score, the hosting device 406 cannot join the video conference. According to aspects of the invention, the connected audio input device or connected audio output device that does not meet the threshold score is ameliorated prior to joining the video conference. Thus, both the connected audio input device and connected audio output device must meet the threshold score to join the video conference.

In embodiments, the readiness score of the primary connected audio device (e.g., for hosting device 406 a microphone, and for client device(s) 410 a speaker) must meet the threshold score before joining the video conference. Thus, a secondary connected audio device (e.g., for hosting device 406 a speaker, and for client device(s) 410 a microphone) may not meet the threshold score, however, may later be ameliorated after the hosting device 406 or client device(s) 410 have joined the video conference.

In implementations, the video conference audio quality amelioration device 404 comprises one or more server computing devices each including one or more elements of the computer system/server 12 of FIG. 1. In one example, the video conference audio quality amelioration device 404 comprises one or more virtual machines (VMs) or one or more containers running on one or more server computing devices. In embodiments, the video conference audio quality amelioration device 404 is configured to determine a readiness score for each device (e.g., 406 and 410) attempting to connect to (e.g., join) a conference, and to provide an amelioration action to any such device whose readiness score does not satisfy a predefined threshold value. In embodiments, and as described herein, the video conference audio quality amelioration device 404 determines the readiness score for each device (e.g., 406 and 410) based on one or more of: user audio magnitude level (e.g., using sound wave analysis for amplitude); user audio clarity level (e.g., using NLP on audio via speech-to-text); user audio connection level (e.g., consistency of audio, abrupt cuts and sound loss, audio lag, and blocking delay/jitter); user audio pertinence level (e.g., based on a combination of other factors to determine if speech is relevant, and including opt-in audio processing and association of semantic meeting category); and audio connection (e.g., based on a Boolean score of whether or not the user has joined, detection of phrases such as "Can you hear me?", detection of successful audio catch and response, and a determination of whether there is more than one open microphone in each location).

In embodiments, the video conference audio quality amelioration device 404 comprises conferencing module 420*c*, audio quality module 421, client connection module 422, readiness module 423, and amelioration module 424, each of which may comprise one or more program module(s) 42 of FIG. 1, for example. The video conference audio quality amelioration device 404 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

In embodiments, the conferencing module 420*c* is configured to work with various video conferencing platforms (i.e., applications). In embodiments, the conferencing module 420*c* works with both host and client devices (of participants). In an exemplary embodiment, hosting device 406 and/or client device(s) 410 each install a conferencing module 420*a* and 420*b*, respectively, that passes information to the conferencing module 420*c*. In an exemplary embodiment, the conferencing module 420*c* interacts directly with video conferencing platforms installed on the hosting device 406 and/or client device(s) 410 without adapted conferencing module(s) 420*a* and 420*b* installed.

In embodiments, the conferencing module 420*c* is configured to receive connecting device data. In embodiments, the connecting device data includes at least one of: a physical location of a connecting device (e.g., hosting device 406 or client device(s) 410) of the video conference; a connectivity value of the connecting device; a digital location of the connecting device (i.e., IP address of the connecting device); available audio devices associated with a user of the connecting device; and other conference preferences of the user for the video conference.

In embodiments, the conferencing module 420*c* is configured to receive host device data associated with a hosting device 406 establishing a video conference. In embodiments, the host device data includes at least one of: a physical location of the hosting device 406 of the video conference; a connectivity value of the hosting device 406; a digital location of the hosting device 406 (i.e., IP address of the hosting device 406); available audio devices associated with a host user of the hosting device 406; and other conference preferences of the host user for the video conference. The host device data may be used to both establish connectivity of the hosting device 406 to the video conference and provide preferences for connectivity and audio quality of client device(s) 410.

In a non-limiting exemplary embodiment, the connectivity value indicates a connection capability of a connecting device (e.g., hosting device 406 or client device(s) 410) to the video conferencing platform. The connectivity value may be determined based on the video conferencing platform (i.e., preferred/supported audio devices of the platform and service capabilities), available bandwidth to the connecting device, network latency of the connecting device (i.e., connection to the video conference platform hosting server(s) 408), and/or historical connectivity information for the connecting device. In an exemplary embodiment, the connectivity value may further include direct collection of connection data based on requesting a connection test be done by a user of the connecting device. Based on the connection test, the conferencing module 420*c* collects the connection data for network latency of the connecting device. For example, the connection test may determine whether the user has connected to the video conference audio, detect a user voice activity, detect a successful audio catch and response and network latency with the connecting device, and determine whether there are more than one open microphones in a location.

In embodiments, each of these determinations is scored to provide device connectivity data (also referred to as client connectivity data or host connectivity data) for the connecting device. A connectivity data score may be used to determine whether a connecting device meets a minimum connectivity threshold to connect to the video conference. For example, a maximum connectivity value of 100 may be for an ideal connection to the video conference in which the connecting device has no latency, using a preferred audio device, and available bandwidth being double the bandwidth that will be used. In this example, a minimum connectivity data score may be 60 for a weak but allowable connection to the video conference. Such a connectivity data may use a preferred audio device, meet bandwidth requirements, but have a network latency that is high, but audio may still be heard clearly with some buffering. Continuing the example, any connectivity data score less than 60 does not provide a good enough connection to the video conferencing platform and reconnection using a different audio device, different connecting device, and/or joining another user is suggested. The connectivity threshold indicates a connectivity quality of the connecting device to the video conference.

In embodiments, the conferencing module 420c also tracks join configurations (e.g., video only, audio only, other video conferencing configuration selections by the user, etc.), successful connection data (e.g., wait time until successful connection using the join configuration), other audio transference devices (e.g., audio devices that are associated with a user of the connecting device and also connected to the video conference), and audio inputs of the user (e.g., the user saying "hello?" or "can you hear me?"). In non-limiting exemplary embodiments, the join configurations may also include used audio and video devices, backgrounds, mute settings, etc., that may affect the quality of the audio connection. In non-limiting exemplary embodiments, the audio transference devices may include audio devices of devices associated with the user, such as a user being associated with both a computer and a mobile device (both of which have their own audio input device and audio output device). For example, a user may connect to the video conference through a computer over video and audio, but their computer audio dies and thus also connects to audio of the video conference using a mobile device. In non-limiting exemplary embodiments, the audio inputs are recorded and a natural language processing algorithm processes the recorded audio input to determine what the user is saying.

In embodiments, the audio quality module 421 is configured to determine a mean opinion score (MOS) of the audio for a user of the connecting device. The MOS indicates an audio quality level of the connected audio device and is used to determine whether a connecting device is ready to join the video conference (e.g., for use in a conferencing readiness score). The MOS is determined by receiving and analyzing audio from the connecting device to determine audio quality data. The MOS may additionally be based on an historic audio quality MOS. The audio quality data includes an audio magnitude level, an audio clarity level, an audio connection level, and an audio pertinence level. Each audio quality data is given a MOS that is totaled to generate the MOS for the user. In exemplary embodiments, the audio magnitude level is determined using a sound wave analysis for amplitude. In exemplary embodiments, the audio clarity level is determined using natural language processing of audio with speech-to-text. In embodiments, when the natural language processing of the audio for speech-to-text cannot determine what is being said, an occlusion has occurred and is noted as a clarity issue. In some instances, this is not as useful of an indication of audio quality, for example when a presenter/host has a strong accent that the natural language processor cannot process. In an exemplary embodiment, the audio connection level is determined based on consistency of the audio, determining whether there are abrupt cuts and sound losses, determining audio lag by comparing against the video, and determining delay and/or jitter in the audio. In an exemplary embodiment, the audio pertinence level is based on determining if the user's speech is occurring at relevant times based on the audio magnitude and audio clarity levels, and determining if the user's speech is associated with the topic being discussed at the video conference based on a semantic analysis using natural language processing.

In embodiments, the client connection module 422 is configured to track devices (including audio devices) associated with users through connecting device information. In embodiments, connecting device information for the connecting devices includes a present physical and digital location of the connecting devices. In embodiments, connecting device information for the connecting devices may also include information about connecting devices of other users, who are also participants in the video conference, these devices being physically proximate to a user. In embodiments, connecting device information for the connecting devices includes historical use by the user of the audio devices during video conferences.

In embodiments, the readiness module 423 is configured to determine a conferencing readiness score. The conferencing readiness score indicates whether a user's audio connection to the video conference can smoothly and capably handle participation in an audio portion of the video conference. Thus, the conferencing readiness score includes one or more determinations based on: a Boolean score of whether or not the user of the connecting device has joined the video conference, detection of a user's voice activity, detection of a successful catch and response, whether there is more than one audio device (multiple audio input devices (e.g., microphones) or multiple audio output devices (e.g., speakers)), audio connection capabilities, and the MOS determinations described above. To make these determinations, the readiness module 423 is configured to collect information for each user from the conferencing module 420c and audio quality module 421 (e.g., MOS). In a non-limiting exemplary embodiment, when the conferencing readiness score falls below a threshold score, the video conference audio quality amelioration device 404 determines an ameliorative action and passes the user to the amelioration module 424.

In embodiments, the amelioration module 424 is configured to determine an ameliorative action when the conferencing readiness score from readiness module 423 does not meet a threshold score. Depending on whether the deficiency in the readiness stems from audio quality or connectivity of the connecting device, the user is provided with an ameliorative action to resolve the deficiency. In embodiments, the amelioration module 424 provides an ameliorative action by transmitting one or more instructions to the device (e.g., 406 or 410) associated with the low conferencing readiness score. In one example, the one or more instructions cause the device to output a suggestion to the user, the suggestion embodying the ameliorative action. In another example, when a user has opted-in for automated control, the one or more instructions cause the device to automatically implement the ameliorative action, e.g., by changing one or more device parameters. In embodiments, for a deficiency in audio quality, the audio device settings are adjusted, or the audio device connection is adjusted. In a non-limiting exemplary embodiment, if the audio magnitude level is too high or too low, the audio magnitude level is adjusted either on the connecting device that is receiving the audio or the connecting device that is sending the audio. For example, audio levels are raised for an audio magnitude level that is too low and audio levels are lowered for an audio magnitude level that is too high.

In a non-limiting exemplary embodiment, if the audio clarity level is too low (e.g., has occlusions), then the amelioration module 424 determines whether the audio device is one that affects audio clarity levels, whether various audio devices may be interfering with one another, and or whether sound buffering may resolve the audio clarity. In a non-limiting exemplary embodiment, determining an audio device affects audio clarity levels includes determining different audio connection types for the audio device (e.g., hardwire line or wireless connection). For example, when the amelioration module 424 determines the audio device is a Bluetooth device, speaker, or other audio device connected over a communication method that modifies clarity, a new connection for the audio device or alternate audio device may be used. For example, when the audio device is a Bluetooth device, the user may be asked to connect the audio device physically over a 3.5 mm audio jack or over wireless networking or other wireless communication method. If the audio device is incapable of other connections, another audio device may be selected based on one or more of: its association to the user; preference by the video conferencing platform; and historical selection or usage by the user. The historical selection may be, for example, from Bluetooth earbuds to a speaker of a mobile device that the Bluetooth earbuds were connected. Further, the other audio device may be selected using an auto-abandonment logic for the next best audio quality and connection. For example, the next best audio device may be another audio device associated with the same connecting device as the audio device that is being abandoned. In embodiments, the audio clarity level may be scored and compared against a predetermined clarity threshold score to indicate that the audio clarity level is high enough to hear the video conference without issue. The audio clarity threshold may indicate a quality of audio clarity based on the audio device's input or output at the connecting device.

In a non-limiting exemplary embodiment, the amelioration module 424 provides a sound buffering configuration to the connecting device for magnitude readjustment to increase the audio magnitude to a connecting device. In a non-limiting exemplary embodiment, the amelioration module 424 determines various audio devices are interfering with one another and the amelioration module 424 selects a single audio device to output the audio of the video conference. In one example, the speaker of a mobile phone and a user's connected Bluetooth headphones are both outputting the audio from the video conference and the sounds are not syncing up resulting in unclear audio. In this example, the amelioration module 424 would provide the connecting device with an amelioration action to block audio from the speaker or headphones based on audio quality (e.g., best MOS) for each audio device, selecting the audio device with the highest MOS. In yet another example, a hosting device 406 has its own microphone and another microphone connected to it through a webcam. Audio from the host may be captured by both microphones; however, there may be feedback caused by using two microphones and thus one of the microphones is selected for use and one is disabled. In this example, the microphone with the highest MOS is selected to remain open and the other microphone is blocked to ensure better audio clarity (e.g., without occlusions from interfering audio).

In embodiments, when the audio connection level is too low, the user is notified of the poor connection and that the user should move to a new location with a stronger connection, join another participating user to listen in on the video conference as seen below, and/or provide an alternate audio connection method. In a non-limiting exemplary embodiment, the new location is selected based on historical micro-location tracking in an area proximate to the user for optimal audio quality. In a non-limiting exemplary embodiment, the micro-location is applied in a machine learning process to adjust audio quality and derive, over time, an optimal audio quality for the micro-location. In a non-limiting exemplary embodiment, the alternate audio connection method includes the video conferencing platform calling the user on their mobile device or having the user connect through a different manner than originally established. In a non-limiting exemplary embodiment, a change in location may result in mesh network transference for the audio connection and/or a change in audio device in instances where a multi-connective audio system is used. For example, as a user changes locations, the audio connection may change network access points. As a result, the system may change a speaker of the multi-connective audio system to provide the closest speaker in the location. In embodiments, the audio connection level may be scored and compared against a predetermined audio connection threshold score to indicate that the audio clarity level is high enough to hear the video conference without issue. The audio connection threshold indicating a quality of audio connection may be based on the connecting device's connection to the audio input or output device.

In embodiments, when the audio pertinence level falls below a pertinence threshold, the user is notified that they will be muted, and the amelioration module 424 automatically mutes the user. In embodiments, when the user cannot connect successfully prior to the video conference, the user is notified to connect through a different manner. For example, a user may be notified that the audio is not connecting, and they should try a different audio connection method (e.g., dial in to a toll-free line, connect through another device, connect through the desktop app instead of the mobile app, etc.).

In embodiments, the amelioration module 424 also determines a social relationship of the user with other users that are physically proximate participants to a user. In a non-limiting exemplary embodiment, these social relationships may first be decided based on relationship to the user and proximity to the user. For example, nearby users may include ones with no relationship to the user and others that are connected through a social network. Persons connected through a social network may be prioritized further based on proximity by analyzing the digital location (e.g., IP address and LAN analysis) and physical location (e.g., GPS) to determine a micro-location of the connecting device that is closest in proximity. Further, previous/historical sharing by participants during past video conferences may be tracked and determined. The historical sharing may be of different participants (the proximate participant and another participant) or the same participants (the proximate participant and the user). However, for historical sharing, when sharing was of the same participants, such sharing will have a higher value than different participants.

Additionally, the participant profiles may be analyzed to determine a potential location of the participant. For example, one participant may include an office address and number in their user profile. The office address may be presumed to be the potential micro-location of the user and may be combined with the digital and physical location to better determine the nearby users' locations. In a non-limiting exemplary embodiment, the other participant's audio device should have an audio quality meeting a pre-determined audio quality level.

In embodiments, once potential alternative options for physically proximate participants to join are found, the amelioration module 424 selects a participant to join that has the highest social relationship, has historically shared audio devices, and/or has the closest micro-location proximity. In a non-limiting exemplary embodiment, the other participant's MOS of the used audio device is tracked to determine the closest other participant with the highest audio device MOS. In a non-limiting exemplary embodiment, each of the social relationships, micro-location determination, historical and current sharing, and audio device MOS have a score that is totaled in determining the best participant to join. In a non-limiting exemplary embodiment, a participant that is currently sharing their audio connection may also be prioritized over a participant that is not currently sharing their audio connection. Once a participant is selected for joining, the user and/or other participant may be notified of the need to have a person to join them and the identity of the person (e.g., other user or participant) joining.

In embodiments, the amelioration module 424 prioritizes solutions based on their effect on the user and other participants. In a non-limiting exemplary embodiment, solutions that fix the audio quality of the audio device are prioritized over changing to other audio devices associated with the user. And changing to other audio devices is prioritized over joining other participants.

Figure 5:
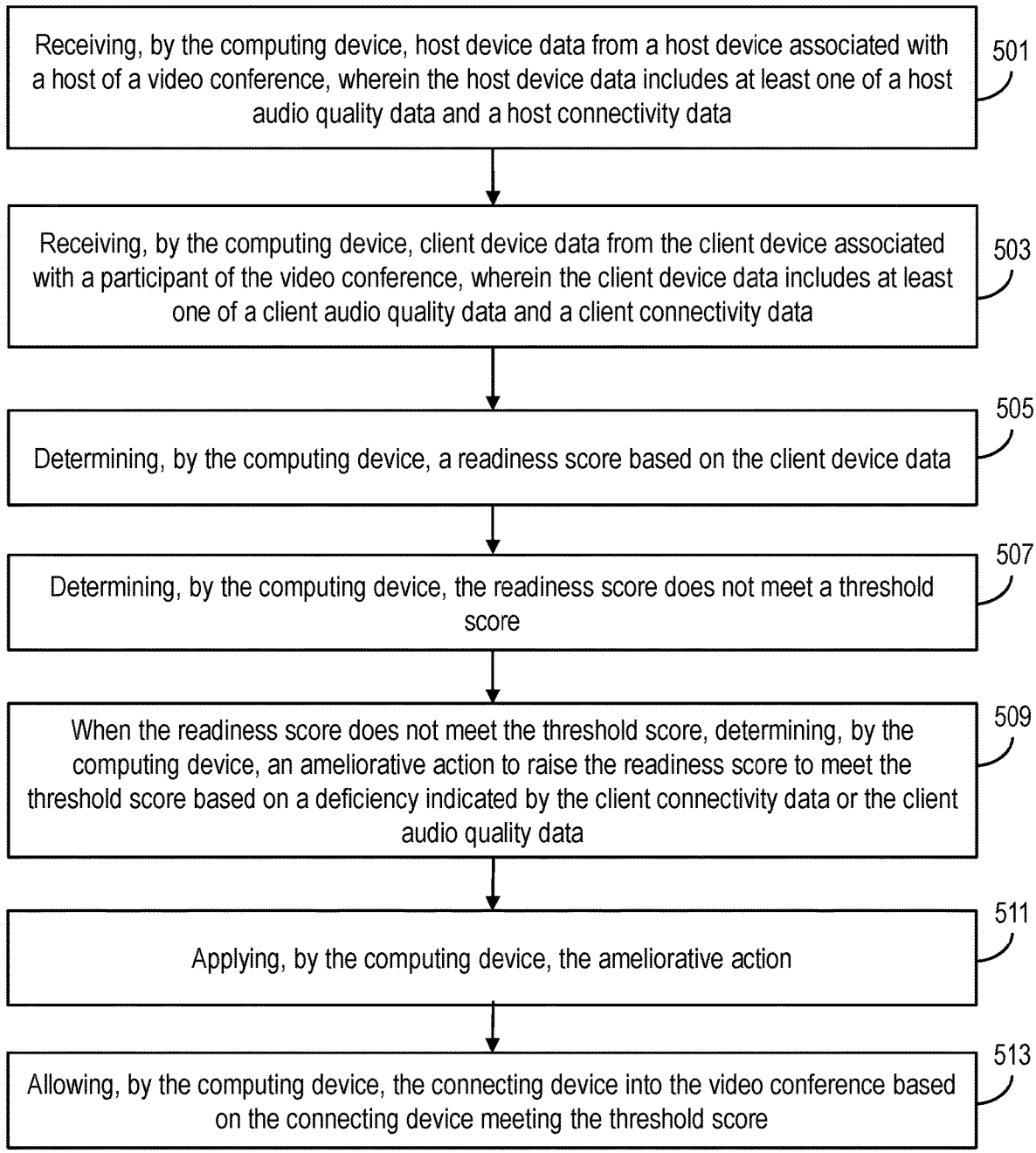
FIG. 5 shows a flowchart of an exemplary method in accordance with aspects of the invention.

FIG. 5 shows a flowchart of an exemplary method in accordance with aspects of the present invention. Steps of the method may be carried out in the environment of FIG. 4 and are described with reference to elements depicted in FIG. 4.

At step 501, the video conference audio quality amelioration device 404 of FIG. 4 receives host device data from a hosting device 406 associated with a host of a video conference, wherein the host device data includes at least one of a host audio quality data and a host connectivity data. In embodiments, the host device data may be used to determine whether the host device audio connection needs amelioration before the video conference begins. In embodiments, the host audio quality data is based on audio collected from the hosting device 406. For example, the host audio quality data may include a microphone audio quality of the associated hosting device 406.

At step 503, the video conference audio quality amelioration device 404 of FIG. 4 receives device data from a client device 410 associated with a participant of the video conference, wherein the client device data includes at least one of a client audio quality data and a client connectivity data. In embodiments, the client device data may be used to determine whether the client device audio connection needs amelioration before the video conference begins. In embodiments, the client audio quality data is based on audio received at the client device 410. For example, the client audio quality data may be based on speaker audio quality of the associated client device 410. In embodiments, the audio connection settings are initially determined based on a historical configuration of the audio device.

At step 505, the video conference audio quality amelioration device 404 of FIG. 4 determines a conferencing readiness score based on collected data. In a non-limiting exemplary embodiment, the conferencing readiness score is based on collected data including connecting device data and/or audio quality data of the client device. In a non-limiting exemplary embodiment, each of the collected data is scored and totaled to represent the conferencing readiness score.

At step 507, the video conference audio quality amelioration device 404 of FIG. 4 determines the conferencing readiness score does not meet a threshold score. In embodiments, the threshold score acts as a total score for collected data that will meet minimum requirements to connect an audio device of the client device without issue.

At step 509, when the conferencing readiness score does not meet the threshold score, the video conference audio quality amelioration device 404 of FIG. 4 determines an ameliorative action to raise the readiness score to meet the threshold score based on a deficiency in the client audio quality data or client connectivity data.

At step 511, the video conference audio quality amelioration device 404 of FIG. 4 provides the ameliorative action to a hosting device 406 or client device 410. In a non-limiting exemplary embodiment, the ameliorative action is based on the factor in which the deficiency is occurring. As described herein, deficiencies may include: the audio magnitude is too high or too low; the audio clarity is too low; the audio connection level is too low; the audio pertinence level is too low; and/or the user cannot connect at all to the video conference. As described herein, a different ameliorative action may be provided to the connecting device based on different deficiencies. In embodiments, the hosting device 406 or client device 410 is provided with a notification of an ameliorative action for a user of the hosting device or client device to apply. In embodiments, the hosting device 406 or client device 410 is provided with the ameliorative action to be applied. In this embodiment, the hosting device 406 or client device 410 is configured to automatically apply the ameliorative action based on instruction provided by the video conference audio quality amelioration device 404.

At step 513, the video conference audio quality amelioration device 404 of FIG. 4 allows the connecting device into the video conference based on the connecting device meeting the threshold score after applying the ameliorative action. In embodiments, the video conference audio quality amelioration device 404 interfaces with the video conference platform hosting server 408 to allow the connecting device to join the video conference. In exemplary embodiments, the video conference audio quality amelioration device 404 sends a request to the video conference platform hosting server 408 to allow the connecting device to join. In embodiments, if audio issues occur after the connecting device has joined the video conference, then an ameliorative action may be applied to return the connecting device to a conferencing readiness score that meets the threshold score.

Figure 6:
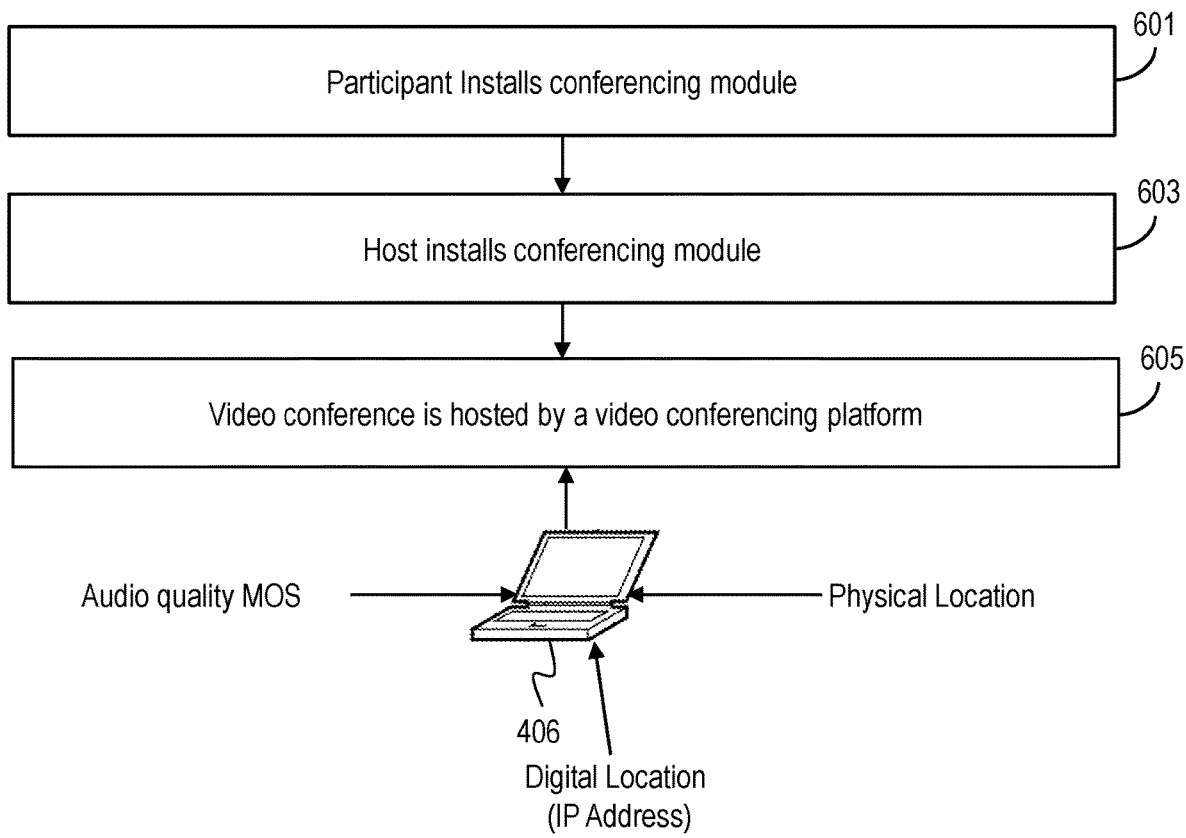
FIG. 6 shows a flowchart of another exemplary method in accordance with aspects of the invention.

FIG. 6 shows a flowchart of another exemplary method in accordance with aspects of the present invention. Steps of the method may be carried out in the environment of FIG. 4 and are described with reference to elements depicted in FIG. 4.

At step 601, a user of a client device 410 of FIG. 4 installs a conferencing module 420*b* for adapting the client device 410 to the video conference audio quality amelioration device 404.

At step 603, a user (e.g., host user) of a hosting device 406 of FIG. 4 installs a conferencing module 420*a* for adapting the hosting device 406 to the video conference audio quality amelioration device 404.

At step 605, the video conference is hosted by a video conferencing platform and host device data is collected from hosting device 406 of FIG. 4 through conferencing module 420a. The host device data includes an audio quality MOS, physical location, and digital location of the hosting device 406.

Figure 7:
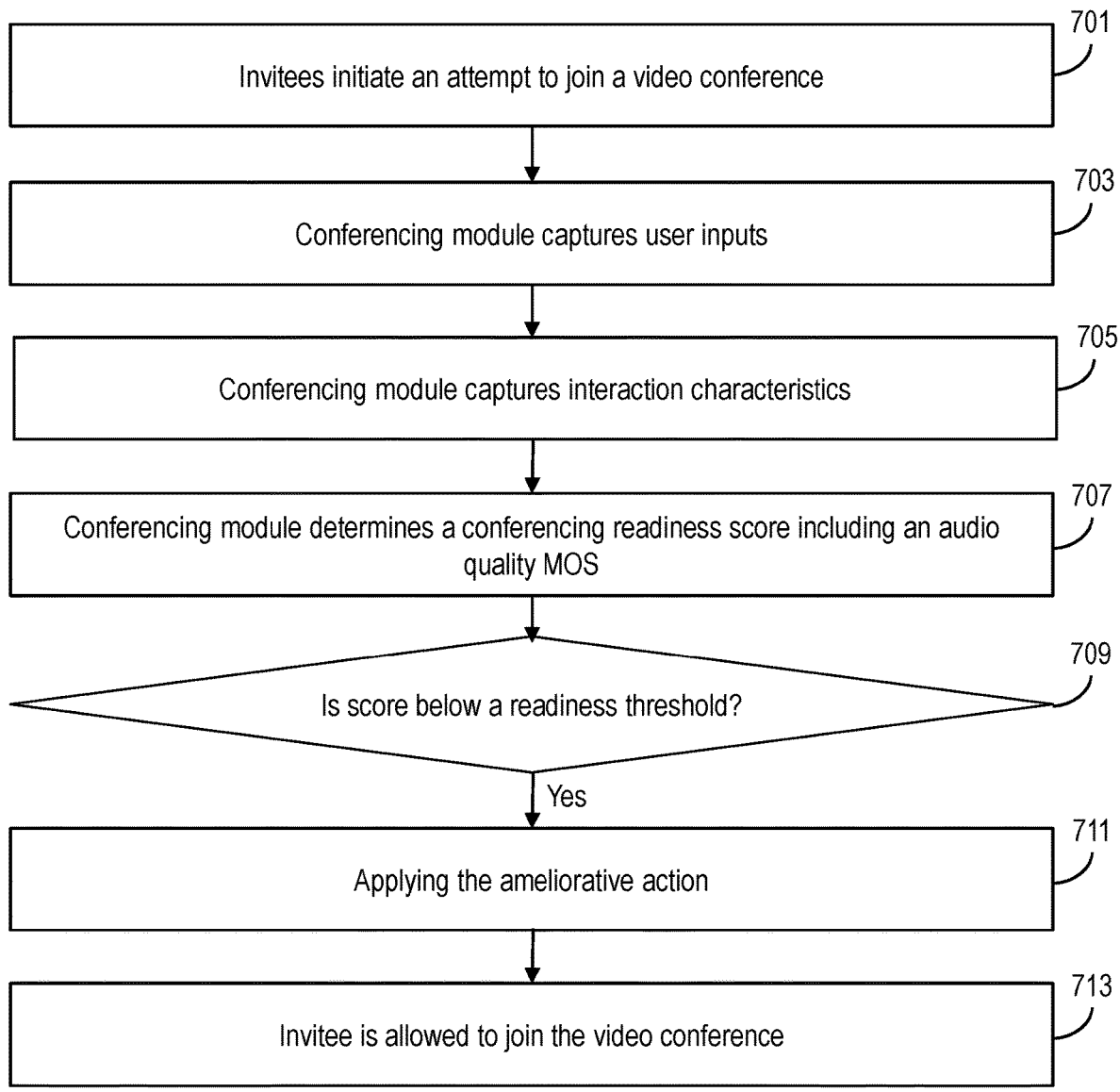
FIG. 7 shows a flowchart of another exemplary method in accordance with aspects of the invention.

FIG. 7 shows a flowchart of another exemplary method in accordance with aspects of the present invention. Steps of the method may be carried out in the environment of FIG. 4 and are described with reference to elements depicted in FIG. 4. In embodiments, the exemplary method of FIG. 7 occurs after the exemplary method of FIG. 6.

At step 701, a client device 410 of FIG. 4 initiates an attempt to join a video conference. In embodiments, the participant is an invitee to the conference. The participant previously installed the conferencing module 420b in FIG. 6 which is now used in the exemplary method of FIG. 7. In embodiments, the invitees may be placed in a waiting room and not allowed to join the video conference until the invitee is determined to be ready to join. In embodiments, readiness of an invitee is determined after the invitee joins the video conference.

At step 703, a conferencing module 420b of FIG. 4 captures user inputs at the client device 410 as the client device 410 joins the video conference. The inputs may include button selections by the participant in configuring the audio connection to the video conference. For example, the participant may select video only or audio only.

At step 705, the conferencing module 420b of FIG. 4 captures interaction characteristics as the client device 410 joins the video conference. The interaction characteristics include at least one of a waiting time until successful connection by the client device 410, audio devices for transference, and participant audio inputs such as vocalizations.

At step 707, the readiness module 423 of FIG. 4 determines a conferencing readiness score including an audio connection and audio quality MOS of the audio device of the client device 410. The conferencing readiness score additionally includes connection data that is associated with interaction characteristics (e.g., user selections) and configurations (e.g., audio settings) of the audio connection to the video conference.

At step 709, a video conference audio quality amelioration device 404 of FIG. 4 determines if the conferencing readiness score is below a threshold score. If the conferencing readiness score is not below a threshold score, the client device 410 is allowed to join the video conference. In the case of the invitee already having joined the video conference, no action is taken.

At step 711, the video conference audio quality amelioration device 404 of FIG. 4 determines an ameliorative action and provides the ameliorative action to the connecting device to increase the conferencing readiness score above the threshold score. In a non-limiting exemplary embodiment, the ameliorative action is based on a deficiency that is occurring in the audio connection to the video conference. The ameliorative action results in the conferencing readiness score meeting or exceeding the readiness threshold.

At step 713, the video conference audio quality amelioration device 404 of FIG. 4 allows the invitee to join the video conference. For example, the invitee is moved from the waiting room to the video conference.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving, by a computing device, connecting device data from a connecting device associated with a participant of a video conference, wherein the connecting device data includes audio quality data and device connectivity data;
determining, by the computing device, a conferencing readiness score of the connecting device prior to joining the video conference based on the connecting device data;
determining, by the computing device, the conferencing readiness score does not meet a threshold score;
determining, by the computing device, an ameliorative action configured to raise the conferencing readiness score of the connecting device to meet the threshold score prior to joining the video conference; and
providing, by the computing device, the ameliorative action to the connecting device to meet the threshold score in order to join the video conference.

2. The computer-implemented method of claim 1, wherein the connecting device data includes one or more selected from the group consisting of:
physical location of the connecting device;
connectivity value of the connecting device;
digital location of the connecting device;
available audio devices associated with a user of the connecting device; and
conference preferences of the user for the video conference.

3. The computer-implemented method of claim 1, wherein the conferencing readiness score is determined based on one or more selected from a group consisting of:
audio magnitude based on a soundwave analysis for amplitude of audio for a participant of the connecting device;

audio clarity based on a natural language processing of the audio;

audio connection level based on consistency of the audio;

audio pertinence based on a determined pertinence of the audio to a topic of the video conference and time of the audio; and audio connection selection based on a mean opinion score (MOS) of audio for each audio device of a set of connecting devices associated with the participant.

4. The computer-implemented method of claim 1, further comprising:

providing another ameliorative action for the participant based on determining a device connectivity falls below a connectivity threshold.

5. The computer-implemented method of claim 1, further comprising:

providing another ameliorative action for the participant based on determining the connecting device cannot connect to the video conference.

6. The computer-implemented method of claim 1, further comprising:

selecting, as the ameliorative action, a participant device of another participant of the video conference based on a physical proximity to the participant and one or more selected from a group consisting of:

a highest conferencing readiness score of the another participant; and social relationship of the another participant to the participant.

7. The computer-implemented method of claim 1, further comprising:

determining a MOS of audio for a participant of the connecting device, and wherein the conferencing readiness score is based on the MOS of the audio.

8. The computer-implemented method of claim 7, wherein the social relationship includes one or more selected from a group consisting of:

relationship of the participant with the another participant;

historical audio share of the participant using an audio connection of the participant device;

distance of the participant device from the participant; and available audio devices of the participant device and audio quality data of each of the available audio devices.

9. The computer-implemented method of claim 3, further comprising:

in response to determining the audio clarity does not meet a clarity threshold, selecting at least one amelioration method from a group consisting of:

determining different audio connection types that will modify the audio clarity;

selecting other available connecting devices of the participant;

selecting a participant device of another participant to share with the participant;

buffering the audio of the connecting device to readjust the audio magnitude; and selecting a single audio source of the connecting device.

10. The computer-implemented method of claim 3, further comprising:

determining the audio connection level does not meet an audio connection threshold; and notifying the participant of a poor connection, wherein the notifying suggests that the participant move to a new physical location.

11. The computer-implemented method of claim 1, wherein the connecting device data includes historical connection configurations of the connecting device to other video conferences.

12. The computer-implemented method of claim 1, wherein the computing device includes software provided as a service in a cloud environment.

13. A computer program product comprising one or more computer readable storage media having program instructions collectively stored on the one or more computer readable storage media, the program instructions executable to:

receive a request to join a video conference;

in response to receiving the request to join the video conference, receive client device data from a client device associated with a participant of the video conference, wherein the client device data includes audio quality data and client connectivity data;

determine a conferencing readiness score of the client device prior to joining the video conference based on the client device data;

determine the conferencing readiness score of the client device prior to joining the video conference does not meet a threshold score;

determine an ameliorative action configured to raise the conferencing readiness score to meet the threshold score; and provide the ameliorative action to the client device to meet the threshold score in order to join the video conference.

14. The computer program product of claim 13, wherein the client device data includes one or more selected from the group consisting of:

physical location of the client device;

connectivity value of the client device based on the client connectivity data;

digital location of the client device;

available audio devices of the client device;

available client devices of the participant; and client user preferences of the participant to connect to the video conference.

15. The computer program product of claim 13, wherein the conferencing readiness score is determined based on one or more selected from a group consisting of:

audio magnitude based on a soundwave analysis for amplitude of audio for a participant of the connecting device;

audio clarity based on a natural language processing of the audio;

audio connection level based on consistency of the audio;

audio pertinence based on a determined pertinence of the audio to a topic of the video conference and time of the audio; and audio connection selection based on a mean opinion score (MOS) of audio for each audio device of a set of connecting devices associated with the participant.

16. The computer program product of claim 13, wherein the program instructions are further executable to:

provide another ameliorative action to the client device based on determining a device connectivity falls below a connectivity threshold after joining the video conference.

17. A system comprising:

a processor, a computer readable memory, one or more computer readable storage media, and program instructions collectively stored on the one or more computer readable storage media, the program instructions executable to:
receive host device data from a hosting device associated with a host of a video conference to initiate the video conference;
receive a request to join the video conference from a client device associated with a participant of the video conference;
in response to receiving the request to join the video conference, place the client device in a waiting room, and receive client device data from the client device, wherein the client device data includes audio quality data and client connectivity data;
determine a readiness score of the client device prior to joining the video conference based on the client device data;
determine the readiness score of the client device prior to joining the video conference does not meet a threshold score, the threshold score indicating a connectivity quality of the client device to the video conference;
determine an ameliorative action to raise the readiness score to meet the threshold score based on the readiness score does not meet the threshold score, wherein the ameliorative action is based on the client device data and a social relationship to the participant; and
provide the ameliorative action to the client device to meet the threshold score in order to move the client device from the waiting room to the video conference.

18. The system of claim 17, wherein the client device data includes one or more selected from the group consisting of:
physical location of the client device;
connectivity value of the client device based on the client connectivity data;
digital location of the client device;
available audio devices of the client device;
available client devices of the participant; and
client user preferences of the participant to connect to the video conference.

19. The system of claim 17, wherein the readiness score includes one or more scores of the audio quality data including one or more selected from the group consisting of:
audio magnitude based on a soundwave analysis for amplitude of audio for a participant of the connecting device;
audio clarity based on a natural language processing of the audio;
audio connection level based on consistency of the audio;
audio pertinence based on a determined pertinence of the audio to a topic of the video conference and time of the audio; and
audio connection selection based on a mean opinion score (MOS) of audio for each audio device of a set of connecting devices associated with the participant.

20. The system of claim 17, wherein the program instructions are further executable to:
provide another ameliorative action to the client device based on determining a device connectivity falls below a connectivity threshold.

* * * * *